United States Patent Office 3,833,549
Patented Sept. 3, 1974

3,833,549
COPOLYMER OF CHLOROPRENE AND DICHLOROBUTADIENE
Sidney George Fogg, Ashtead, England, assignor to BP Chemicals International Limited, London, England
No Drawing. Filed July 20, 1972, Ser. No. 273,543
Claims priority, application Great Britain, July 21, 1971, 34,154/71; Jan. 19, 1972, 2,629/72
Int. Cl. C08f 15/06, 15/40
U.S. Cl. 260—80.7                     6 Claims

ABSTRACT OF THE DISCLOSURE

Copolymers of (a) chloroprene and (b) 1,3-dichlorobutadiene-1,3 or (b) a mixture of 1,3-dichlorobutadiene-1,3 and 2,3-dichlorobutadiene.

---

The present invention relates to chloroprene polymers. In particular it relates to copolymers of chloroprene having improved properties.

It is well known that an improvement in the cold resistance of chloroprene rubbers can be achieved by reducing their crystallinity and retarding their rate of crystallisation. To achieve this chloroprene may be copolymerised with various copolymerisable materials, for example styrene, acrylonitrile or 2,3-dichlorobutadiene. The reactivity of these comonomers differs greatly from that of chloroprene. If the comonomer reacts too rapidly a heterogenous copolymer results. If the comonomer reacts too slowly, the comonomer is not used efficiently and much of it remains at the end of the polymerisation. Such copolymers often have inferior physical properties as compared with polychloroprene.

An object of the present invention is to provide new chloroprene polymers having a good balance of properties.

Accordingly, the present invention provides a copolymer of chloroprene and 1,3-dichlorobutadiene-1,3 formed from a mixture comprising chloroprene and 1% to 20% by weight of 1,3-dichlorobutadiene-1,3. The invention further provides a copolymer of chloroprene and mixed dichlorobutadienes formed from a monomeric mixture comprising chloroprene and from 1 to 20% by weight of a mixture of 1,3-dichlorobutadiene-1,3 and 2,3-dichlorobutadiene-1,3.

Small amounts of 1,3-dichlorobutadiene-1,3 in a chloroprene copolymer result in improved properties. The proportion of 1,3-dichlorobutadiene-1,3 or of said mixture of dichlorobutadienes is most suitably below 10% and preferably in the range of 2% to 8% by weight of the final copolymer. The preferred copolymers do not contain any other copolymerisable materials but useful products can be obtained when such materials are present.

Surprisingly it is found that the presence of copolymer units derived from both 1,3-dichlorobutadiene-1,3 and 2,3-dichlorobutadiene-1,3 in a chloroprene copolymer improves the properties of the copolymer to a greater extent than the same number of units derived solely from 2,3-dichlorobutadiene-1,3. Suitably the mixed dichlorobutadienes, from which the copolymers according to the present invention are formed, are present in the ratio of 0.05 to 0.70 parts of the 1,3-isomer for every part of the 2,3-isomer.

The copolymerisation reaction of the present invention may be brought about by any of the techniques normally employed for the copolymerisation of chloroprene. Most suitably the copolymerisation is carried out with the monomer material in emulsion in an aqueous system. Preferably when chloroprene is to be polymerised with the mixed dichlorobutadienes, the monomer feed contains from 1 to 2% of 1,3-dichlorobutadiene-1,3 and from 3 to 6% 2,3-dichlorobutadiene-1,3.

The copolymers of the present invention may be prepared by any of the techniques normally employed for the copolymerisation of chloroprene. Most suitably the copolymerisation is carried out with the mixed monomers in emulsion in an aqueous system.

The preferred emulsifying agents for use in the production of the copolymers of the present invention are the water soluble salts of rosin acids which are suitably employed in a proportion of about 2% to 6% by weight based on the weight on monomeric material present in the polymerisation system.

Conventional initiators for chloroprene copolymerisation may be used in the above process, e.g. alkali metal or ammonium persulphates and ferricyanides. Organic hydroperoxides may also be used alone or in admixture with the inorganic persulphates. Catalyst activators and copolymerisation modifiers may also be present. Examples of catalyst activators are sodium bisulphite, sodium dithionite and sodium 2-anthraquinone sulphonate. Examples of copolymerisation modifiers are sulphur, the alkyl mercaptans, iodoform and the di-isoalkyl xanthogen disulphides.

All the monomeric materials can be present at the start of the copolymerisation or part can be present at the start and the remainder added during copolymerisation. If desired, the proportion of chloroprene to 1,3-dichlorobutadiene-1,3 or to the mixture of dichlorobutadienes may be varied during the copolymerisation process as, in the latter case, may the ratio of the two dichlorobutadiene isomers in the dichlorobutadiene employed.

Copolymerisation is preferably carried out at a temperature between 0° and 90° C., the preferred range being from 30° to 60° C. Below 5° C. the copolymerisation is generally too slow for convenience while above 80° the reaction may be difficult to control. The percentage of monomer converted to polymer is usually between 50 and 100, preferably less than 85.

Copolymerisation may be stopped at any point if desired by the addition of "short stopping" agents e.g. p-tert-butyl catechol and phenothiazine in quantities of about 0.01% of each compound in relation to the weight of monomeric material employed. Small amounts of di-alkyl di-thiocarbamates such as, for example, dimethyl ammonium dimethyl dithiocarbamate are effective as short stopping agents.

The copolymers of the present invention may be recovered and isolated from the copolymerisation reaction mixture by any of the techniques normally employed for the recovery of chloroprene polymers. The copolymers of this invention show reduced crystallinity as compared with polychloroprene and yet retain to a great extent the known useful properties of polychloroprene.

The following examples illustrate the production of copolymers according to the present invention, the quantities referred to in the polymerisation charges being in parts by weight:

| Polymerisation charge | Parts | Example 1 | 2 | 3 | 4 |
|---|---|---|---|---|---|
| Chloroprene | | 96.81 | 92.7 | 95.8 | 96.5 |
| 1,3-dichlorobutadiene-1,3 (as a 30% w./w. pure feedstock) | | 3.19 | 7.3 | | |
| 1,3-dichlorobutadiene-1,3 (as a 70% w./w. pure feedstock) | | | | 3.36 | 2.87 |
| n-Dodecyl mercaptan | 0.255 | | | | |
| Dresinate 214, a rosin acid emulsifying agent | 4.0 | | | | |
| Daxad 15 (a naphthalene sulphonic acid formaldehyde condensation product) | 0.7 | | | | |
| Sodium hydroxide | 0.1 | | | | |
| Water | 124.0 | | | | |
| Initial catalyst: | | | | | |
| Sodium dithionite | 0.0346 | | | | |
| Water | 0.910 | | | | |
| Pumped catalyst per hour: | | | | | |
| Ammonium persulphate | 0.00238 | | | | |
| Water | 0.820 | | | | |
| Short-stop ingredients: | | | | | |
| p-Tertiary butyl catechol | 0.01 | | | | |
| Phenothiazine | 0.01 | | | | |
| Toluene | 0.80 | | | | |
| Daxad 15 | 0.01 | | | | |
| Sodium decyl benzene sulphonate | 0.02 | | | | |
| Water | 0.80 | | | | |

The polymerisation charge and initial catalyst was maintained at 40° C. under nitrogen and further catalyst was pumped in as indicated. The polymerisation was short stopped at 70% conversion by the addition of the short stop ingredients. During the polymerisation the latex was sampled and analysed for residual monomer composition and content. At an overall conversion of 70% 87.1% in the case of example 1, 87% in the case of example 2, 86.6% in the case of example 3 and 87.8% in the case of example 4 of the 1,3-dichlorobutadiene-1,3 had been consumed. The resultant copolymer was isolated by conventional means.

| Polymerisation charge | Parts | Example 5 | 6 |
|---|---|---|---|
| Chloroprene | | 91.3 | 85.7 |
| 2,3-dichlorobutadiene | | 8.2 | 13.4 |
| 1,3-dichlorobutadiene-1,3 | | 0.51 | 0.94 |
| n-Dodecyl mercaptan | 0.25 | | |
| Dresinate 214 rosin acid salt as emulsifying agent | 4.0 | | |
| Sodium hydroxide | 0.1 | | |
| Daxad 15 (a naphthalene sulphonic acid-formaldehyde condensation product) | 0.70 | | |
| Water | 124.0 | | |
| Initial catalyst: | | | |
| Sodium dithionite | 0.03 | | |
| Water | 0.77 | | |
| Pumped catalyst per hour: | | | |
| Ammonium persulphate | 0.0017 | | |
| Water | 0.7 | | |

Sodium dithionite was added to the emulsified polymerisation charge and immediately ammonium persulphate solution was pumped into the reactor. A constant feed of ammonium persulphate solution was maintained throughout the polymerisation. The polymerisation was carried out at 40° C. under nitrogen. After 7¾ hours reaction time, conversion reached 69.6% and the polymerisation was short stopped by addition of the following emulsion.

Short Stop Emulsion

| | |
|---|---|
| p-Tert. butyl catechol | 0.01 |
| Phenothiazine | 0.01 |
| Toluene | 0.80 |
| Daxad 15 | 0.01 |
| Sodium decyl benzene sulphonate | 0.02 |
| Water | 0.80 |

For both latices residual monomer was removed by steam stripping. The polymers were recovered from the latices by coagulation as a thin film on a freeze roll at pH of 5.8 (achieved by acidifying the latex with 10% acetic acid), and dried by passing through an air stream at 142° C. Analysis of the monomeric material present when the polymerisation was stopped indicated that the percentages of the monomers initially present that had copolymerised were as follows:

| Example | 5 | 6 |
|---|---|---|
| Monomer: | | |
| 2,3-dichlorobutadiene-1,3 | 97.2 | 96.9 |
| 1,3-dichlorobutadiene-1,3 | 88.9 | 86.2 |
| Chloroprene | 67.4 | 66.5 |

The resistance to crystallization of the copolymers was determined in gum vulcanisate cured using zinc oxide 5 parts by weight per 100 parts rubber (phr.) and magnesium oxide (4 phr.) as curatives and ethylene thiourea 0.5 phr. as acccelerator. The mixture was prepared on a two roll rubber mixing mill and samples were press cured for 20 minutes at 153° C. A series of samples was also prepared from copolymers of pure (98%) 2:3 dichlorobutadiene-1,3 at various levels and chloroprene using the recipe in example 1 except that the 1,3-dichlorobutadiene was replaced by 2,3-dichlorobutadiene. Copolymers were prepared using 2.9, 10 and 15 parts of 2,3-dichlorobutadiene.

Samples were stretched at 150% elongation at −5° C. and the variation in stress with time was measured. The time for the stress to fall to 75% of its original value (T¼) was determined and the results were as follows. The greater the T¼ value the greater is the resistance to crystallisation and the longer the rubber will retain its rubbery properties.

| | Time (minutes) |
|---|---|
| Example 1 | 240 |
| Example 2 | 2,200 |
| Example 3 | 405 |
| Example 4 | 315 |
| Example 5 | 5,600 |
| Example 6 | >10,000 |

A graph of the T¼ time for the 2,3-dichlorobutadiene copolymers against proportion of 2,3-dichlorobutadiene was prepared and the T¼ time of copolymers of 2,3-dichlorobutadiene using the same levels of 2,3-dichlorobutadiene as total dichlorobutadienes used in examples 1–6 were calculated as follows

| | |
|---|---|
| Example 1 | 220 |
| Example 2 | 1,800 |
| Example 3 | 240 |
| Example 4 | 180 |
| Example 5 | 3,000 |
| Example 6 | >10,000 |

These results show that the copolymers according to the present invention are superior to equivalent copolymers containing solely 2,3-dichlorobutadiene-1,3.

I claim:

1. A solid copolymer of chloroprene and 1,3-dichlorobutadiene-1,3 formed by aqueous emulsion polymerisation at a temperature of between 0° and 90° C. of a monomeric mixture consisting essentially of chloroprene and 1 to 20% by weight of 1,3-dichlorobutadiene-1,3.

2. A solid copolymer of chloroprene, 1,3-dichlorobutadiene-1,3, and 2,3-dichlorobutadiene-1,3 formed by aqueous emulsion polymerisation at a temperature of from 0° to 90° C. of a monomeric mixture consisting essentially of chloroprene and from 1 to 20% by weight of a mixture of 1,3 - dichlorobutadiene - 1,3 and 2,3 - dichlorobutadiene-1,3.

3. A copolymer as claimed in claim 1 wherein the dichlorobutadiene is present in the range 2 to 8% by weight of the final copolymer.

4. A copolymer as claimed in claim 2 wherein the mixed dichlorobutadienes are present in the range 2 to 8% by weight of the final copolymer.

5. A copolymer as claimed in claim 2 wherein the mixture of dichlorobutadienes contains 0.05 to 0.70 part of the 1,3-isomer for every part of the 2,3-isomer.

6. A copolymer as claimed in claim 5, wherein the monomer feed from which the copolymer is formed contains from 1 to 2 percent by weight of 1,3-dichlorobutadiene-1,3 and 3 to 6 percent by weight of 2,3-dichlorobutadiene-1,3.

References Cited
UNITED STATES PATENTS

| | | | |
|---|---|---|---|
| 2,849,503 | 8/1958 | Eberly et al. | 260—655 |
| 3,078,247 | 2/1963 | Sinn et al. | 260—29.7 |

STANFORD M. LEVIN, Primary Examiner

U.S. Cl. X.R.

260—87.5 R